United States Patent Office 2,938,895
Patented May 31, 1960

2,938,895

METALLIFEROUS DISAZO DYESTUFFS CONTAINING HEAVY METAL IN COMPLEX UNION AND A REACTIVE TRIAZINE NUCLEUS

Fritz Oesterlein, Basel, Switzerland, assignor to Ciba Limited, Basel, Switzerland No Drawing. Filed Oct. 6, 1958, Ser. No. 765,282

Claims priority, application Switzerland Oct. 11, 1957

7 Claims. (Cl. 260—146)

This invention provides new complex metal compounds of water-soluble disazo-dyestuffs. These products are metalliferous disazo-dyestuffs which contain a sulfonic acid group and contain, per metallizable group, one-half an atom of a heavy metal, advantageously chromium or cobalt, bound in complex union with a disazo-dyestuff of the formula (1)
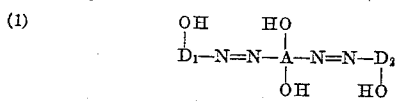

in which $D_1$—OH and $D_2$—OH each represents the radical of a diazo-component, advantageously of the benzene series which is bound to the azo linkage in a position vicinal to the hydroxyl group, and at least one of which radicals contains a halogen-1:3:5-triazine radical, and HO—A—OH represents the radical of a coupling component capable of coupling twice and which is bound to the azo linkages on each side in a position vicinal to the hydroxyl groups.

It will be understood from the foregoing remarks that the metal compounds of this invention are symmetrical or asymmetrical complexes, that is to say, they contain two identical or different disazo-dyestuffs of the Formula 1. The disazo-dyestuffs present in the complex metal compounds may themselves be of symmetrical or asymmetrical structure.

The complex metal compounds of ths invention can be made by treating with an agent yielding chromium or cobalt the appropriate metal-free dyestuffs which contain a triazine radical as defined above.

Advantageously, the complex metal compounds of this invention are made by condensing with one another (a) a complex metal compound of a metalliferous disazo-dyestuff which contains a sulfonic acid group and contains, permetallisable group, one-half atom of heavy metal bound in complex union to a disazo-dyestuff of the formula (2)
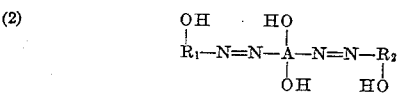

in which $R_1$—OH and $R_2$—OH each represents the radical of a diazo-component, advantageously of the benzene series, bound to the azo linkage in a position vicinal to the hydroxyl group, and of which radicals at least one contains an acylatable group, and HO—A—OH represents the radical of a coupling component capable of coupling twice and which is bound on each side to the azo linkages in a position vicinal to the hydroxyl groups, and (b) at least one halogen-triazine of the formula (3)
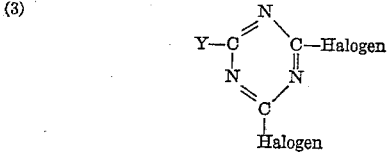

in which Y represents an alkyl or aryl group, or an etherified hydroxyl or mercapto group or advantageously an amino group which may be substitued, or a halogen atom, and, if desired, at an intermediate stage or, in the product so obtained condensing one or more of the dihalogen-triazine radicals with ammonia, an organic mercapto- or hydroxy-compound or an at most secondary amine, and so choosing the relative proportions of the reactants that the final product contains at least one monohalogen- or dihalogen-triazine radical.

For example, in a trihalogen-triazine, especially cyanuric chloride (2:4:6-trichloro-1:3:5-triazine), one or two halogen atoms are exchanged in such manner that one halogen atom is exchanged for the radical of a 1:2-complex chromium or cobalt compound of a disazo-dyestuff of the Formula 2 which contains a disazo-dyestuff having an acylatable group, more especially an acylatable amino group, and that, if desired, the other halogen atom is exchanged for a free amino group or the radical of an organic compound having or not having the character of a dyestuff. Alternatively, a metalliferous azo-dyestuff of the kind defined above may be condensed with a 2:4-dihalogen-1:3:5-triazine which contains in 6-position a free amino group or an organic substituent, for example, a dihalogen-triazine of the formula (4)
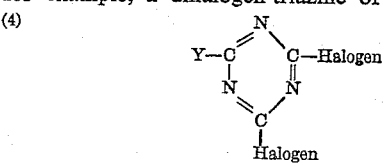

in which Y represents an alkyl or aryl group or an etherified hydroxyl or mercapto group or especially an amino group which may be substituted, in such manner that condensation takes place at the acylatable group and only one of the two halogen atoms is exchanged.

The dihalogen-triazines of the Formula 4 can be made by methods in themselves known from cyanuric halides, such as cyanuric bromide or cyanuric chloride, by reacting for example, one mol of cyanuric chloride with one mol of a reactive organic mercapto- or hydroxy-compound (for example, a phenol or an alcohol), and with one mol of ammonia or one mol of an at most secondary and advantageously a primary amine having or not having the character of a dyestuff. As such compounds there may be used, for example, aliphatic or aromatic mercapto or hydroxy-compounds, especially alcohols or phenols of low molecular weight, or methylamine, ethylamine, isopropylamine, methoxyethylamine, methoxypropylamine, cyclohexylamine, dimethylamine, diethylamine or N-methyl-phenylamine, chlorethylamine, aniline, ethanolamine, piperidine, morpholine, an aminocarbonic acid ester, an aminoacetic acid ethyl ester, hydrazine, phenyl-hydrazine or ammonia, or, if desired, an amine containing a group imparting solubility in water, such as an aminoethane sulfonic acid, aminoacetic acid, N-methylamino-ethane sulfonic acid, ortho-, meta- or para-aminobenzoic acid, an aminosalicylic acid, an aminobenzoic acid sulfonic acid, an aminobenzene sulfonic acid such as ortho-, meta- or para-aminobenzene sulfonic acid, or an aminonaphthalene sulfonic acid, or an amino-monoazo-dyestuff or other amino dyestuff, for example, of the xanthone, thioxanthone or anthraquinone series.

The metalliferous starting dyestuffs to be used for condensation with the halogen-triazines of the Formula 3 or 4 can be made by methods in themselves known, for example, by using disazo-dyestuffs of the Formula 2 which contain, in addition to the ortho:ortho'-dioxy-azo-groupings capable of forming metal complexes, at least one acylatable group, more especially an acylatable amino group, that is to say, a primary or secondary amino group, which is bound directly to one of the external nuclei of the dyestuff molecule. Such metallisable disazo-dyestuffs can be obtained by the reduction of disazo-dyestuffs containing a nitro group and two metallisable ortho:ortho'-dioxy-azo-groupings, or by hydrolysing metallisable disazo-dyestuffs containing an acylamino group, for example, by splitting off the acyl group or reducing the nitro group of dyestuffs which have been prepared from ortho-hydroxy-diazo-compounds of the benzene series containing an acylamino group or a nitro group and coupling components capable of coupling twice in positions vicinal to two hydroxyl groups. As examples of suitable coupling components there may be mentioned di-(aceto-acetylamino)-benzenes, di-(acetoacetylamino)-diphenyl, di-(acetoacetylamino)-stilbene, stilbene-dipyrazolones, 5:5'-dihydroxy-2:2'-dinaphthyl-urea-7:7'-disulfonic acid, and more especially 5:5'-dihydroxy-2:2'-dinaphthylamine-7:7'-disulfonic acid. As examples of suitable diazo-components there may be mentioned 1-hydroxy-2-amino-6-acetylaminobenzene-4-sulfonic acid, 1-hydroxy-2-amino-4-nitro-acetylaminobenzene, 4-nitro-2-aminophenol-6-sulfonic acid or 6-nitro-2-aminophenol-4-sulfonic acid. The hydrolysis of the metallisable disazo-dyestuffs containing an acylamino group, obtainable from the aforesaid components, can be carried out during or after metallization of the dyestuff.

The conversion of the dyestuffs obtained from the aforesaid components into the complex metal compounds to be used as starting materials in the process of this invention may be carried out while the dyestuffs are present in the coupling mixture.

The treatment with the agent yielding chromium or cobalt is carried out in such manner that there is obtained a chromiferous or cobaltiferous dyestuff containing, per metalizable grouping, one-half atom of chromium or cobalt bound in complex union.

Accordingly, the metallization is advantageously carried out with such an agent yielding chromium or cobalt and by such a method that a complex chromium or cobalt compound of the aforesaid constitution is obtained. For this purpose it is generally of advantage to use less than two and advantageously about one atomic proportion of chromium or cobalt for each molecular proportion of dyestuff and/or to carry out the metallization in a weakly acid to alkaline medium. Accordingly, there are especially suitable for carrying out the process those chromium or cobalt compounds which are stable in alkaline media, for example, complex chromium or cobalt compounds of aliphatic hydroxy-carboxylic acids or dicarboxylic acids, or complex chromium or cobalt compounds of aromatic ortho-hydroxycarboxylic acids.

As examples of aliphatic hydroxy-carboxylic acids or dicarboxylic acids there may be mentioned, inter alia, lactic acid, glycollic acid, citric acid and especially tartaric acid, and among aromatic ortho-hydroxy-carboxylic acids there may be mentioned, for example, those of the benzene series such as 4-, 5- or 6-methyl-1-hydroxybenzene-2-carboxylic acid and especially 1-hydroxybenzenecarboxylic acid itself. As agents yielding cobalt there may be used, however, simple compounds of divalent cobalt, such as cobalt acetate or cobalt sulfate or, if desired, cobalt hydroxide.

The conversion of the dyestuffs into the complex chromium or cobalt compounds is advantageously carried out at a raised temperature under atmospheric or superatmospheric pressure, for example, at the boiling temperature of the reaction mixture, if desired, in the presence of a suitable addition, for example, a salt of an organic acid or of a base or an organic solvent or other agent capable of assisting the formation of complexes.

A unitary dyestuff may be subjected to the aforesaid metallization. However, it is also possible and in many cases of advantage, for example, for producing various shades of color, to metallize a mixture of two different metallizable disazo-dyestuffs as defined above.

The condensation of the aforesaid complex metal compounds of disazo-dyestuffs with cyanuric chloride or with a dihalogen-triazine of the Formula 4 is advantageously carried out in the presence of an acid binding agent, such as sodium acetate, sodium hydroxide or sodium carbonate and under conditions such that at least one exchangeable halogen atom remains in the finished product per triazine nucleus, that is to say, for example, by working in the presence of an organic solvent or at a relatively low temperature in an aqueous medium.

The new dyestuffs of this invention are suitable for dyeing or printing a very wide variety of materials, especially polyhydroxylated fibrous materials, such as cellulosic materials and also synthetic fibers, for example, of regenerated cellulose, or natural materials, for example, cellulose, linen or above all cotton. They are suitable for dyeing by the so-called direct dyeing methods, from alkaline aqueous baths which may have a high concentration of a salt, and especially by printing or pad dyeing processes in which the dyestuff is applied to the material to be dyed by printing or foularding and fixed on the fiber by means of an agent capable of binding acid, if desired, under the action of heat.

The dyestuffs so obtained are preferably isolated at a low temperature, for example, by salting out and filtration, or by evaporating the mixture in which they are prepared. The filtered dyestuffs may be dried, if desired, after the addition of an extender or stabilizing agent. Advantageously the drying is carried out at not too high a temperature and under reduced pressure. In some cases it is possible to prepare dry preparations directly by spray drying the whole mixture in which the dyestuff is prepared, that is to say, without intermediate isolation of the dyestuff. In this manner valuable new dry preparations are obtained which are suitable for preparing stock solutions or dyebaths or, if desired, printing pastes.

Dyeings produced on cellulosic fibers with the dyestuffs of this invention are generally distinguished by their good fastness to light and above all by their excellent fastness to washing.

The following examples illustrate the invention, the parts and percentages being by weight unless otherwise stated and the relationship of parts by weight to parts by volume being the same as that of the kilogram to the liter:

Example 1

48.7 parts of the disazo-dyestuff obtained by coupling diazotized 1-hydroxy-2-amino-6-acetylamino-4-sulfonic acid in an alkaline medium with 5:5'-dihydroxy-2:2'-dinaphthylamino-7:7'-disulfonic acid are heated in 800 parts of a sodium hydroxide solution of 4% strength for one hour at 90–95° C. to hydrolyse the acetylamino group. After neutralizing the mixture with hydrochloric acid to a pH value of 8, 120 parts of a solution of sodium chromosalicylate having a chromium content of 2.6% are added, and the whole is boiled under reflux for 4 hours.

In order to prepare the symmetrical dichlorotriazine derivative of the alkaline solution of the chromium compound of the dyestuff, which contains two azo linkages per chromium atom, is adjusted to a pH-value of 7 with dilute hydrochloric acid. 18.5 parts of cyanuric chloride dissolved in a small amount of acetone are added at 0–5° C., while stirring well, and the pH-value is maintained constant at about 7 by the dropwise addition of 50 parts by volume of a 2 N-solution of sodium hydroxide.

After the addition of 5 parts of monosodium phosphate and 5 parts of disodium phosphate, the solution is evaporated to dryness at 30–40° C. in vacuo.

The new dyestuff so obtained dyes cellulose fibers blue tints in the manner described in Example 7, which tints have a good fastness to washing and light.

In order to produce the symmetrical monochlorotriazine derivative the procedure described in the second paragraph of this example is first carried out, and to the resulting solution are added 125 parts of a 2 N-solution of ammonia and the whole is stirred for 3 hours at 35–40° C. By the addition of sodium chloride the dyestuff is precipitated, and is then filtered off and dried in vacuo at 50° C. It is the chromium complex compound, containing one half atom of chromium per metallizable o:o'-dihydroxyazo grouping, of the disazo dyestuff of the formula

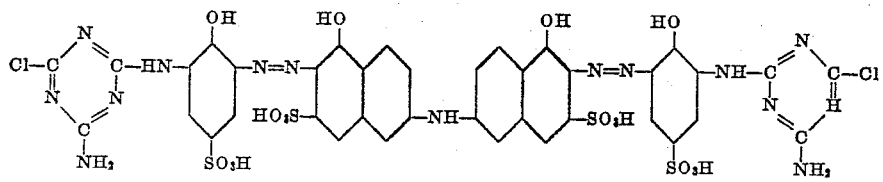

The new dyestuff dyes cellulose fibers by the method described in Example 7 blue tints which are of good fastness to washing and light.

By using 4-nitro-6-acetylamino-2-amino-1-hydroxybenzene as diazo-component, instead of 6-acetylamino-2-amino-1-hydroxy-benzene-4-sulfonic acid, there are obtained by hydrolysis, metallization, condensation with cyanuric chloride and, if desired, reaction with ammonia as described in this example, dichloro- and monochloro-triazine containing chromium complex compounds which can be fixed on cellulose fibers to give greenish grey tints. The corresponding complex cobalt compounds of the dyestuff from 4-nitro-6-acetylamino-2-amino-1-hydroxybenzene dye cotton fast grey tints.

Example 2

48.7 parts of the disazo-dyestuff obtained by coupling diazotized 1-hydroxy-2-amino-6-acetylamino-benzene-4-sulfonic acid in an alkaline medium with 5:5'-dihydroxy-2:2'-dinaphthylamino-7:7'-disulfonic acid are heated in 800 parts of sodium hydroxide solution of 4% strength for one hour at 90–95° C. to hydrolyse the acetylamino group. After adjusting the pH-value of the mixture to 9 with hydrochloric acid, 100 parts of a cobalt sulfate solution having a cobalt content of 3.25% are added. After stirring the mixture for ½ hour at 70–80° C. the formation of the cobalt compound is complete.

The symmetrical monochloro- and dichloro-triazine compounds are prepared by the methods described in Example 1 for preparing the corresponding chromium compounds.

The new dyestuffs dye cellulose fibers by the method described in Example 7 dull violet-blue tints of good fastness to washing and light.

Example 3

The diazo-compound of 23.4 parts of 6-nitro-2-aminophenol-4-sulfonic acid is coupled with 46.1 parts of 5:5'-dihydroxy-2:2'-dinaphthylamino-7:7'-disulfonic acid in a solution rendered alkaline with sodium carbonate, and the intermediate product so obtained is coupled with the diazo-compound of 24.6 parts of 6-acetylamino-2-aminophenol-4-sulfonic acid to form the asymmetrical disazo-dyestuff, and then the acetyl group is split off by heating the dyestuff with dilute caustic soda solution.

The amino-disazo-dyestuff so obtained is condensed in aqueous solution with 18.4 parts of cyanuric chloride at 0–10° C., and the monochloro-triazine derivative so formed is reacted with 120 parts of a 2 N-solution of ammonia at 30° C. The dyestuff is salted out, filtered off and dried. It is the chromium complex compound of the disazo-dyestuff of the formula

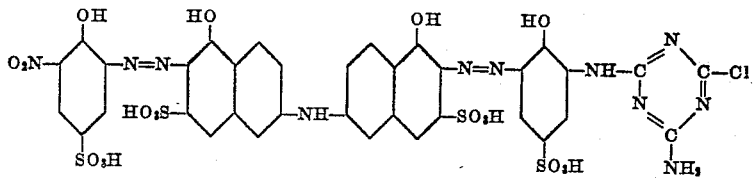

said chromium complex compound containing, per metallizable group, substantially half an atomic proportion of chromium in complex union with said disazo-dyestuff; it dyes cotton blue tints.

Dyestuffs having similar properties are obtained by using, instead of the diazo-compound of 6-nitro-2-aminophenol-4-sulfonic acid, the diazo compound of 2-aminophenol-4-sulfonic acid or of 2-aminophenol-4:6-disulfonic acid or of 1-amino-2-hydroxynaphthalene-4-sulfonic acid. The dyestuff from 2-aminophenol-4-sulfonic acid is the chromium complex compound of the disazo-dyestuff of the formula

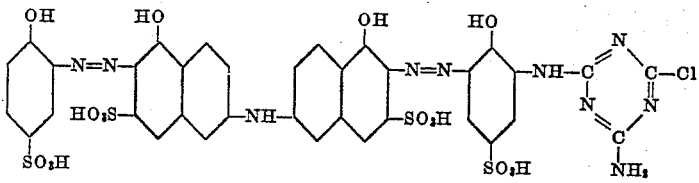

said chromium complex compound containing, per metallizable group, substantially half an atomic proportion of chromium in complex union with said disazo-dyestuff.

Example 4

The primary condensation product obtained from 17.3 parts of 1-aminobenzene-2-sulfonic acid and 18.5 parts of cyanuric chloride in known manner, is condensed with the complex chromium compound obtained as described in the first paragraph of Example 1. The condensation is carried out in a neutral aqueous solution and at approximately 40° C. There is obtained a dyestuff which dyes cotton blue tints that are fast to light and washing.

Instead of the 1-aminobenzene-2-sulfonic acid used for making the primary condensation product, another amine may be used, for example, 1-aminobenzene-3-sulfonic acid, 2-aminonaphthalene-4:8-disulfonic acid, 2-aminonaphthalene-6-sulfonic acid, 1-aminobenzene-2-carboxylic acid, 2-aminoethanol, ethylamine, 3-methoxypropyl-amine, morpholine, aniline, diethanolamine. Dyestuffs having similar properties are obtained with all these amines.

By using in this example, instead of the aforesaid primary condensation product, 18 parts of 2-methoxy-4:6-dichloro-triazine or 27 parts of 2-phenylthio-4:6-dichlorotriazine or 33 parts of 2-phenoxy-4:6-dibromo-1:3:5-triazine, dyestuffs having similar properties are obtained.

*Example 5*

46.7 parts of the disazo-dyestuff, obtained by coupling 2 mols of diazotized 1-hydroxy-2-amino-6-acetylamino-benzene-4-sulfonic acid with 1 mol of 5:5'-dihydroxy-2:2'-dinaphthyl-urea-7:7'-disulfonic acid in an alkaline medium and then splitting off the acetyl group by hydrolysis with sodium hydroxide solution of 3% strength, are converted into the 1:2-complex chromium compound in the manner described in Example 1. By the method described in Example 1, the complex chromium compound is condensed with cyanuric chloride, the reaction product is reacted with ammonia, and the resulting mono-chloro-triazine dyestuff is isolated. It is the chromium complex compound of a disazo-dyestuff containing per metallizable group, substantially half an atomic proportion of chromium in complex union with a disazo-dyestuff of the formula

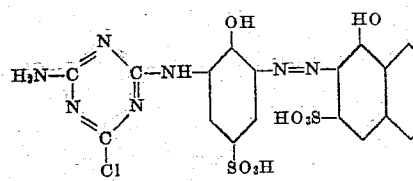

and dyes cotton dull violet-brown tints of good fastness to light and washing.

By using, instead of ammonia, ethylamine or 2-amino-ethanol or methylamine dyestuffs having similar properties are obtained.

By using in this example, instead of 5:5'-dihydroxy-2:2'-dinaphthyl-urea-7:7'-disulfonic acid, the corresponding quantity of stilbene-dipyrazolone-2:2'-disulfonic acid and otherwise proceeding as described in this example, there is obtained a dyestuff which dyes cotton red-orange tints.

*Example 6*

1 part of the dyestuff obtained as described in Example 1 is mixed with 6 parts of urea dissolved in 41 parts of water, and the solution is stirred into 50 parts of an aliginate thickening of 4% strength. 2 parts of calcined sodium carbonate are added, and a cotton fabric is printed with the resulting printing paste on a roller printing machine.

The fabric so printed is dried, then steamed for 6 minutes at 100–101° C. It is then rinsed, treated in a sodium bicarbonate solution of 0.5% strength, rinsed, soaped for ¼ hour in solution of 0.3% strength of a non-ionic detergent at the boil, rinsed and dried. There is obtained a blue print which is fixed fast to boiling.

*Example 7*

2 parts of the dyestuff obtained as described in the first four paragraphs of Example 1 are dissolved in 100 parts of water. A cotton fabric is impregnated with the solution on a foulard, and squeezed until it retains 75% of its weight of dyestuff solution. The impregnated fabric is then dried, and impregnated at room temperature in a solution containing, per liter, 10 grams of sodium hydroxide and 300 grams of sodium chloride, then squeezed to a weight increase of 75%, and steamed for 60 seconds at 100–101° C. The fabric is then rinsed, soaped for ¼ hour in an aqueous solution of 0.3% strength of a non-ionic detergent, rinsed and dried. There is obtained a blue dyeing fixed fast to boiling.

What is claimed is:

1. A water-soluble metal complex compound of a disazo-dyestuff of the formula

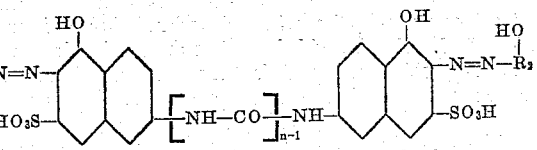

in which $n$ is a whole positive number up to 2, $R_1$—OH and $R_2$—OH each represents a hydroxybenzene radical bound to the azo linkages in ortho position relatively to the hydroxyl group, one of said hydroxybenzene radicals containing a member selected from the group consisting of 2:4-dichloro-1:3:5-triazine, 2-methoxy-4-chloro-1:3:5-triazine, 2-phenoxy-4-chloro-1:3:5-triazine, 2-phenylthio-4-chloro-1:3:5-triazine, 2-phenoxy-4-bromo-1:3:5-triazine, and 2-chloro-4-amino-1:3:5-triazine radicals bound in its 6-position by an —NH-bridge, and wherein the OH groups indicated on the said formula are the sole metallizable group, said metal complex compound containing a sulfonic acid group and, per metallizable group, substantially one-half an atomic proportion of a heavy metal selected from the group consisting of chromium and cobalt bound in complex union with said disazo-dyestuff.

2. A water-soluble chromium complex compound of a disazo-dyestuff of the formula

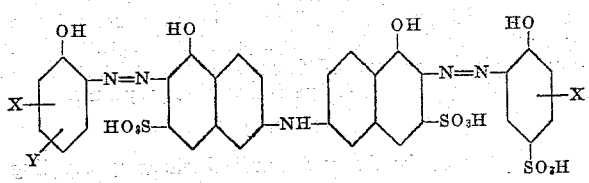

in which Y represents a member selected from the group consisting of a hydrogen atom and a sulfonic acid group, one X represents a member selected from the group consisting of a nitro group, a hydrogen atom and a 2-chloro-4-amino-1:3:5-triazine substituent bound by an —NH-bridge in its 6-position and the other X represents a 2-chloro-4-amino-1:3:5-triazine substituent bound by an —NH-bridge in its 6-position, said chromium complex compound containing, per metallizable group, substantially half an atomic proportion of chromium in complex union with said disazo-dyestuff.

3. A water-soluble cobalt complex compound of a disazo-dyestuff of the formula

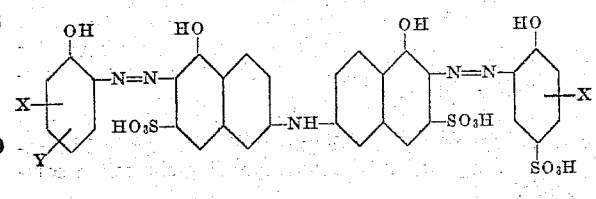

in which Y represents a member selected from the group consisting of a hydrogen atom and a sulfonic acid group, one X represents a member selected from the group consisting of a nitro group, a hydrogen atom and a 2-chloro-4-amino-1:3:5-triazine substituent bound by an —NH-bridge in its 6-position and the other X represents a 2-chloro-4-amino-1:3:5-triazine substituent bound by an —NH-bridge in its 6-position, said cobalt complex compound containing, per metallizable group, substantially half an atomic proportion of cobalt in complex union with said disazo-dyestuff.

4. The water-soluble chromium complex compound of the disazo-dyestuff of the formula

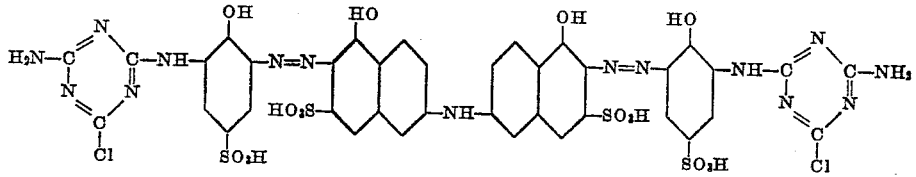

said chromium complex compound containing, per metallizable group, substantially half an atomic proportion of chromium in complex union with said disazo-dyestuff.

5. The water-soluble chromium complex compound of the diazo-dyestuff of the formula

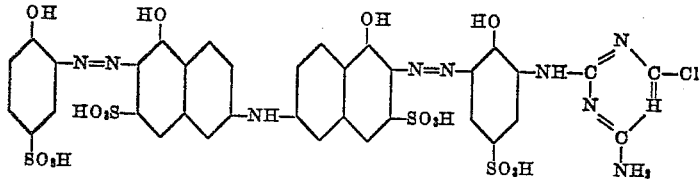

said chromium complex compound containing, per metallizable group, substantially half an atomic proportion of chromium in complex union with said disazo-dyestuff.

6. The water-soluble chromium complex compound of the disazo-dyestuff of the formula

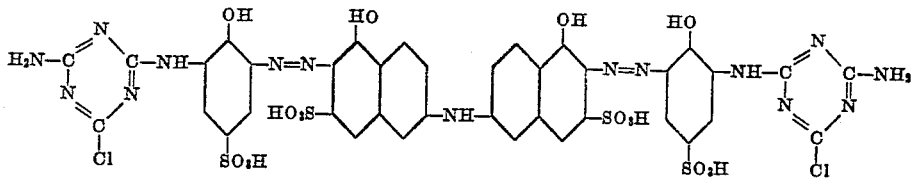

said chromium complex compound containing, per metallizable group, substantially half an atomic proportion of chromium in complex union with said disazo-dyestuff.

7. The water-soluble cobalt complex compound of the disazo-dyestuff of the formula

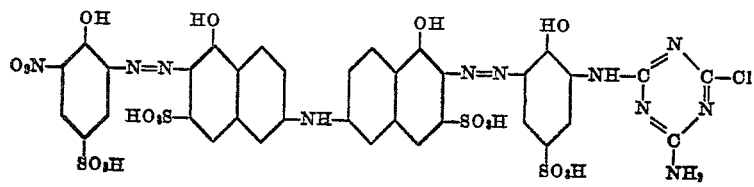

said cobalt complex compound containing, per metallizable group, substantially half an atomic proportion of cobalt in complex union with said diazo-dyestuff.

References Cited in the file of this patent
UNITED STATES PATENTS

| | | |
|---|---|---|
| 2,780,619 | Durig et al. | Feb. 5, 1957 |
| 2,860,128 | Gunst | Nov. 11, 1958 |

UNITED STATES PATENT OFFICE

CERTIFICATE OF CORRECTION

Patent No. 2,938,895                                May 31, 1960

Fritz Oesterlein

It is hereby certified that error appears in the printed specification of the above numbered patent requiring correction and that the said Letters Patent should read as corrected below.

Column 2, line 3, for "substitued" read -- substituted --; column 3, line 37, for "metalizable" read -- metallizable --; columns 9 and 10, lines 30 to 37, the right-hand portion of the formula should appear as shown below instead of as in the patent:

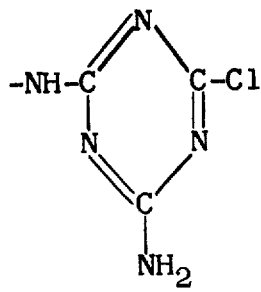

Signed and sealed this 1st day of November 1960.

(SEAL)
Attest:

KARL H. AXLINE                                         ROBERT C. WATSON
Attesting Officer                               Commissioner of Patents